United States Patent [19]

Perez-Cavero

[11] 4,130,851

[45] Dec. 19, 1978

[54] DIRECTIONAL RELAYS

[75] Inventor: Leonardo Perez-Cavero, Haughton, England

[73] Assignee: The General Electric Company Limited, London, England

[21] Appl. No.: 706,515

[22] Filed: Jul. 19, 1976

[30] Foreign Application Priority Data

Jul. 22, 1975 [GB] United Kingdom ............... 30603/75

[51] Int. Cl.² .............................................. H02H 3/26
[52] U.S. Cl. ....................................... 361/82; 361/84; 361/86
[58] Field of Search .................. 361/82, 84, 79, 67, 361/68, 86, 88, 76; 324/86

[56] References Cited

U.S. PATENT DOCUMENTS

| 2,922,109 | 1/1960 | Hodges et al. | 361/82 X |
| 3,048,744 | 8/1962 | Warrington | 361/82 X |
| 3,651,377 | 3/1972 | Souillard | 361/82 |
| 3,898,530 | 8/1975 | Perez-Cavero | 361/80 X |
| 3,958,153 | 5/1976 | Narayan | 361/88 X |

OTHER PUBLICATIONS

"A New Single-Phase-to-Ground Fault-Detecting Relay", W. K. Sonnemann, Sep. 1942, vol. 61 Electrical Engr., pp. 677-680.

Primary Examiner—Patrick R. Salce
Attorney, Agent, or Firm—Kirschstein, Kirschstein, Ottinger & Cobrin

[57] ABSTRACT

A directional relay for a polyphase electric power transmission system wherein the direction of a fault from the relaying point is determined by determining the sense of the variation of the zero or negative sequence voltage of the system between the relaying point and the fault point.

9 Claims, 9 Drawing Figures

DIRECTIONAL RELAYS

This invention relates to directional relays for polyphase electric power transmission systems.

In a known directional relay for such a system the relative phase of the zero or negative sequence voltage and current at the relaying point, i.e. the point at which the relay is connected to the system, is determined. The sense of the relative phase indicates whether the position of a fault is up-line or down-line with respect to the relaying point.

Such a directional relay suffers from the disadvantage that the zero or negative sequence voltage at the relaying point may be so low as to render the relay incapable of satisfactory operation.

It is an object of the present invention to provide a directional relay for a polyphase electric power transmission system wherein this difficulty is overcome.

According to the present invention a directional relay for a polyphase electric power transmission system comprises: means for producing first and second voltages whose amplitude difference under fault conditions corresponds in sense to the sense of the variation of the zero or negative sequence voltage of the system between the relaying point and the fault point in a given direction along the system; and comparator means for producing an output indicative of the sense of the amplitude difference of said first and second voltages.

The first and second voltages are suitably respectively of the form $$V_A \mp I_A Z_r'$$

and $$V_A \mp I_A Z_r''$$

where $V_A$ is the zero or negative sequence voltage at the relaying point; $I_A$ is the corresponding current at the relaying point; and $Z_r'$ and $Z_r''$ are impedances having values such that the first and second voltages simulate desired zero or negative sequence voltages. It will be seen that the first and second voltages are thus readily obtainable from quantities available at the relaying point.

In a preferred arrangement the first and second voltages are respectively of the form $V_A - I_A Z_r'$ and $V_A \pm I_A Z_r''$ and the impedances $Z_r'$ and $Z_r''$ have moduli which satisfy the condition $|Z_r'| > |Z_r''|$ and the condition $|Z_r' + Z_r''| \leq 2|Z_L|$ when the second voltage is of the form $V_A - I_A Z_r''$ or the condition $|Z_r' - Z_r''| \leq 2|Z_L|$ when the second voltage is of the form $V_A + I_A Z_r''$, $Z_L$ being the zero or negative sequence impedance, as appropriate, of the system between the relaying point and the end of the system in said given direction.

The impedances $Z_r'$ and $Z_r''$ will normally have an argument substantially the same as that of the impedance presented to the current $I_A$ by the system.

It will be appreciated that in a relay according to the invention zero-sequence quantities are used for detecting the direction of unbalanced faults involving earth connection, whilst negative sequence quantities are used for detecting the direction of unbalanced faults, with or without earth connection.

The invention will now be further explained and one particular relay arrangement in accordance with the invention will be described, by way of example, with reference to the accompanying drawings in which.

Figure 1:
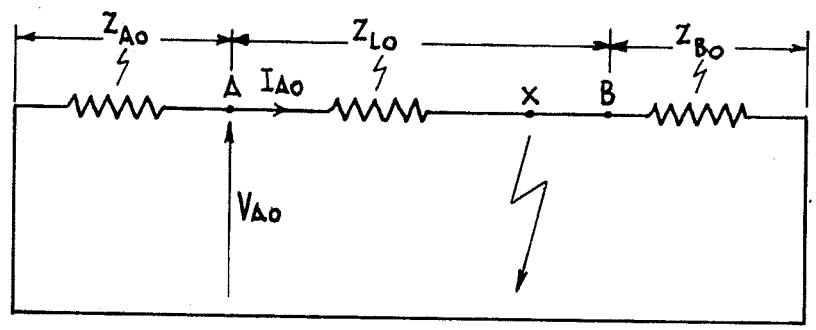
FIG. 1 is a zero-sequence impedance diagram for an electric power transmission system with an earth fault down-line of a directional relay.

Referring to FIG. 1, $Z_{Lo}$ represents the zero-sequence impedance of the system between the relaying point A and down-line end B of the system. $Z_{Ao}$ represents the zero-sequence impedance of the system up-line of the relaying point and $Z_{Bo}$ represents the zero-sequence impedance of the system beyond the end B of the system. X indicates the point of occurrence of an earth fault down-line of the relaying point A.

Figure 2:
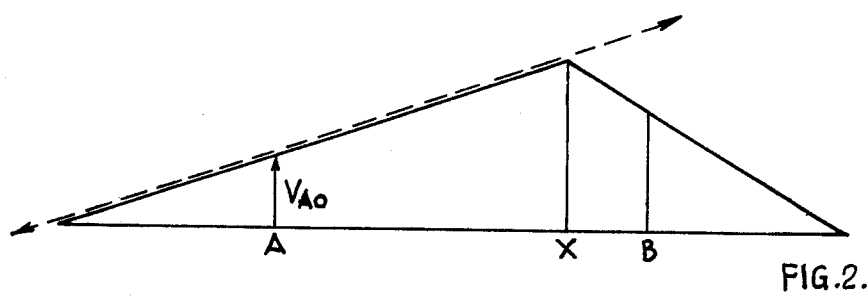
FIG. 2 is a diagram showing the variation of zero-sequence voltage along the system of FIG. 1.

In the presence of such a fault the zero-sequence voltage of the system varies along the system as shown in FIG. 2, the zero-sequence voltage being a maximum at the fault point.

Figure 3:
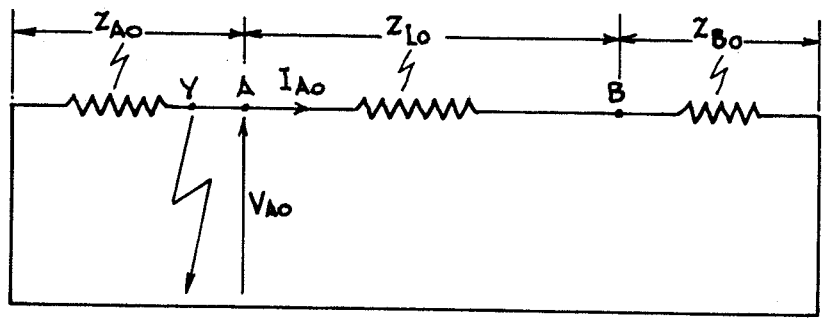
FIGS. 3 and 4 are impedance and voltage diagrams corresponding to FIGS. 1 and 2 respectively but for a fault up-line of the relay.
Figure 4:
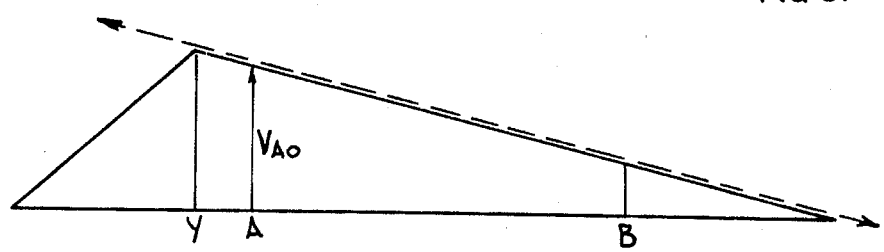

With a fault at a point Y up-line of the relaying point, as shown in FIG. 3, the zero-sequence voltage of the system varies along the system as shown in FIG. 4, the zero-sequence voltage again being a maximum at the fault point.

From FIGS. 2 and 4 it will be apparent that the direction of a fault can be established by determining the sense of the variation of the zero-sequence voltage between the fault point and the relaying point in a given direction along the system. The sense of this variation can be established by determining the sense of the amplitude difference of two voltages $V_o'$ and $V_o''$ given by the following expressions $$V_o' = V_{Ao} \mp I_{Ao} Z_r' \quad (1)$$

$$V_o'' = V_{Ao} \mp I_{Ao} Z_r'' \quad (2)$$

where $V_{Ao}$ is the zero-sequence voltage at the relaying point;
$I_{Ao}$ is the zero-sequence current at the relaying point; and $Z_r'$ and $Z_r''$ are replica impedances representing power system impedances.

Hence a relay arrangement in accordance with the invention will simply comprise means for producing voltages $V_o'$ and $V_o''$ and an amplitude comparator for producing an output indicative of the sense of the amplitude difference of $V_o'$ and $V_o''$. It will be apparent to those skilled in the art that the voltage producing means will typically comprise an arrangement of voltage and current transformers suitably interconnected via impedances of appropriate value.

The argument of the impedances $Z_r'$ and $Z_r''$ is such that voltages $V_o'$ and $V_o''$ vary with the moduli of the impedances in a corresponding manner to the variation of the system zero-sequence voltage between the relaying point and the fault point i.e. such that the voltages $V_o'$ and $V_o''$ simulate the zero-sequence voltage at points in the system dependent on the moduli of $Z_r'$ and $Z_r''$. Thus the argument of $Z_r'$ and $Z_r''$ is chosen in dependence on the actual argument of the system source and the impedances.

Similarly the signs of the terms $I_{Ao}Z_r$ and hence of the terms $Z_r'$ and $Z_r''$ in equations (1) and (2) depend on whether the zero-sequence voltage to be simulated is down-line or up-line from the relaying point, i.e. in the forward or reverse direction of operation of the relay.

Thus the voltages $V_o'$ and $V_o''$ will lie at positions on the dashed lines in FIGS. 2 and 4, depending on the signs and moduli of $Z_r'$ and $Z_r''$ and may simulate zero-sequence voltages which do not in fact exist in the system.

As mentioned above, the signs of the impedances $Z_r'$ and $Z_r''$ correspond to the signs of the terms $I_{Ao}Z_r'$ and $I_{Ao}Z_r''$. Thus the sign of any of these terms can be changed in several ways, for example, by reversing the polarity of the current passing through an impedance replica $Z_r'$ or $Z_r''$.

The maximum and relative values of the moduli of the impedances $Z_r'$ and $Z_r''$ required for satisfactory operation can be maintained as follows:

Taking the condition for indication of a fault in the forward direction of operation of the relay to be $$|V_o'| > |V_o''|$$

i.e.

$$|V_{Ao} \mp I_{Ao}Z_r'| > |V_{Ao} \mp I_{Ao}Z_r''|$$

then, since $V_{Ao} = -I_{Ao}Z_{Ao}$, it can be shown that for [$+Z_r'$, $+Z_r''$]; [$-Z_r'$, $+Z_r''$] and [$-Z_r'$, $-Z_r''$] the criterion $|V_o'| > |V_o''|$ will be satisfied for all values of the moduli of $Z_r'$, $Z_r''$, even with low values of $V_{Ao}$, so long as $$|Z_r'| > |Z_r''| \qquad (3)$$

and for [$-Z_r'$, $+Z_r''$] the criterion $|V_o'| > |V_o''|$ will be satisfied so long as $|Z_r' - Z_r''| > 2|Z_{Ao}|$ The condition for non-indication of a fault in the reverse direction of operation of the relay is $$|V_o''| > |V_o'|$$

i.e.

$$|V_{Ao} \mp I_{Ao}Z_r''| > |V_{Ao} \mp I_{Ao}Z_r'|$$

i.e.

$$|V_{Ao}/I_{Ao} \mp Z_r''| > |V_{Ao}/I_{Ao} \mp Z_r'|$$

and since $V_{Ao}/I_{Ao} = Z_{Lo} + Z_{Bo}$ (See FIG. 3) the condition for non-indication is $$|Z_{Lo} + Z_{Bo} \mp Z_r''| > |Z_{Lo} + Z_{Bo} \mp Z_r'|$$

The four possible sign combinations of $Z_r'$ and $Z_r''$ are considered separately, as follows.

(i) [$+Z_r'$ and $+Z_r''$]
Condition for non-indication:

$$|Z_{Lo} + Z_{Bo} + Z_r''| > |Z_{Lo} + Z_{Bo} + Z_r'| \therefore$$
$$|Z_r''| > |Z_r'|$$

This equation is in direct contradiction with equation (3). Consequently, positive signs cannot be used for both impedances.

(ii) [$+Z_r'$ and $-Z_r''$]

Condition for non-indication:

$$|Z_{Lo} + Z_{Bo} - Z_r''| > |Z_{Lo} + Z_{Bo} + Z_r'|$$

It is apparent that this combination cannot give satisfactory results.

(iii) [$-Z_r'$ and $+Z_r''$]
Condition for non-indication:

$$|Z_{Lo} + Z_{Bo} + Z_r''| > |Z_{Lo} + Z_{Bo} - Z_r'|$$

This condition is met for any value of $Z_r'$ and $Z_r''$ as long as $|Z_{Lo} + Z_{Bo}| \geqq |Z_r'|$.

For $|Z_r'| > |Z_{Lo} + Z_{Bo}|$ then $$|Z_{Lo} + Z_{Bo} + Z_r''| > |Z_r' - (Z_{Lo} + Z_{Bo})| \therefore$$
$$|2(Z_{Lo} + Z_{Bo})| > |Z_r' - Z_r''|$$

Since the impedance $Z_{Bo}$ at the remote end of the line is an unknown quantity and can be small, the condition for non-indication should be esablished as follows:

$$|Z_r' - Z_r''| > 2|Z_{Lo}| \qquad (4)$$

(iv) [$-Z_r'$ and $-Z_r''$]
Condition for non-indication:

$$|Z_{Lo} + Z_{Bo} - Z_r''| > |Z_{Lo} + Z_{Bo} - Z_r'|$$

Since $|Z_r'| > |Z_r''|$ for this combination of signs of $Z_r'$ and $Z_r''$, the above condition is met for any values of $Z_r'$ and $Z_r''$, as long as $|Z_r'| < |Z_{Lo} + Z_{Bo}|$ and $|Z_r''| < |Z_{Lo} + Z_{Bo}|$ If $|Z_r'| > |Z_{Lo} + Z_{Bo}|$ and $|Z_r''| > Z_{Lo} + Z_{Bo}$ $$|Z_{Lo} + Z_{Bo} - Z_r''| > |Z_r' - (Z_{Lo} + Z_{Bo})|$$
$$2|Z_{Lo} + Z_{Bo}| > |Z_r' + Z_r''|$$

As in Case (iii), since the value of $Z_{Bo}$ is unknown, the values of the impedances $Z_r'$ and $Z_r''$ should be such that $$|Z_r' + Z_r''| \leqq 2|Z_{Lo}| \qquad (5)$$

From equations (3) and (5), it is evident that $$Z_r'' < Z_{Lo}$$

Thus it is seen that two modes of operation A and B exist for which $|V_o'| > |V_o''|$ for earth faults in the forward direction and $|V_o''| > |V_o'|$ for earth faults in the reverse direction so that the sense of the amplitude difference of the voltages $V_o'$ and $V_o''$ indicates the direction of an earth fault.

These two modes may be defined as follows (A)

$$V_o' = V_{Ao} - I_{Ao}Z_r'$$

$$V_o'' = V_{Ao} + I_{Ao}Z_r''$$

$$|Z_r'| > |Z_r''|$$

and $$|Z_r' - Z_r''| \leqq 2|Z_{Lo}|$$

(B)

$$V_o' = V_{Ao} - I_{Ao}Z_r'$$

$$V_o'' = V_{Ao} - I_{Ao}Z_r''$$

$$|Z_r'| > |Z_r''|$$

and $$|Z_r' + Z_r''| \leq 2|Z_{Lo}|$$

(i.e. $|Z_r''| < |Z_{Lo}|$)

Figure 5A:
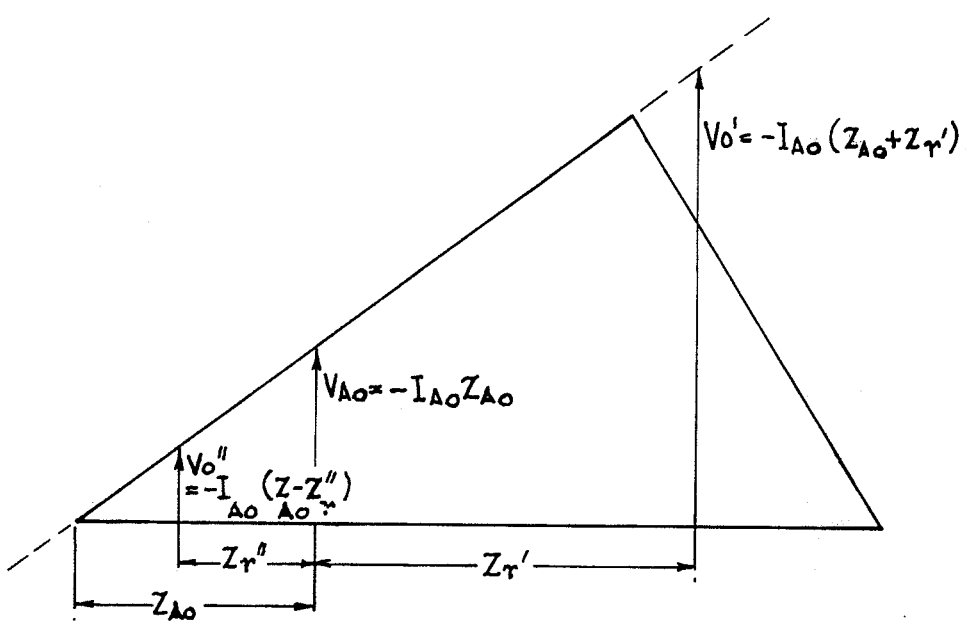
FIGS. 5 and 6 are voltage profile diagrams which illustrate the operation of a directional relay in accordance with the invention.
Figure 5B:
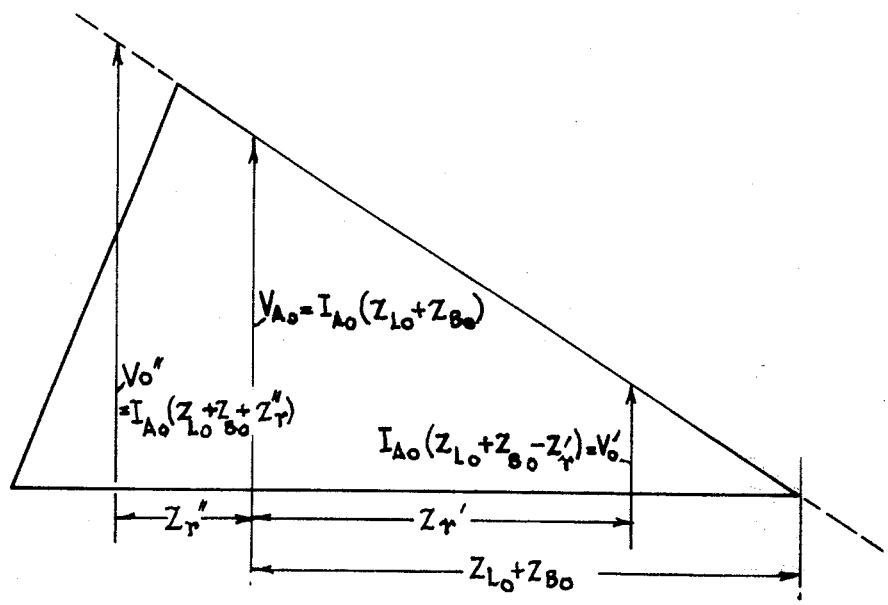
Figure 6A:
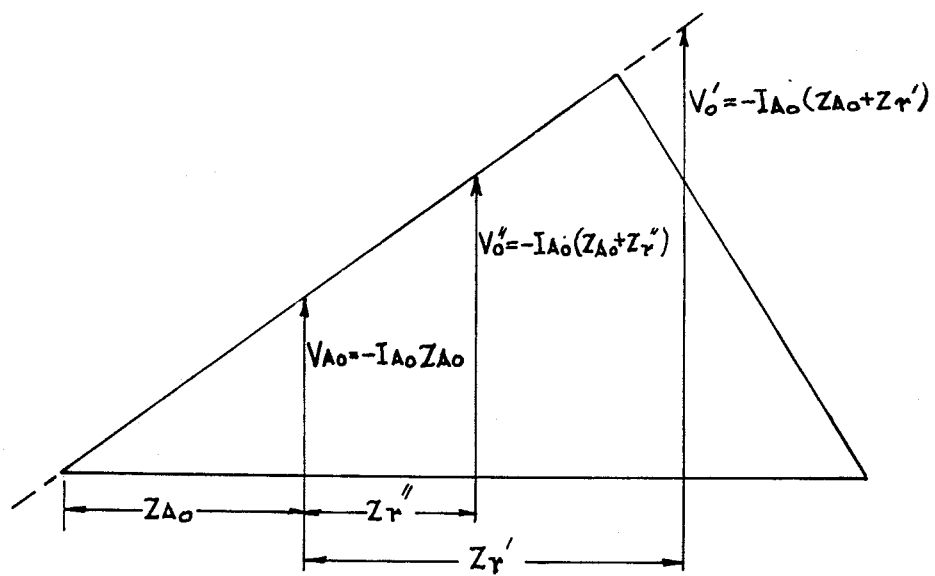
Figure 6B:
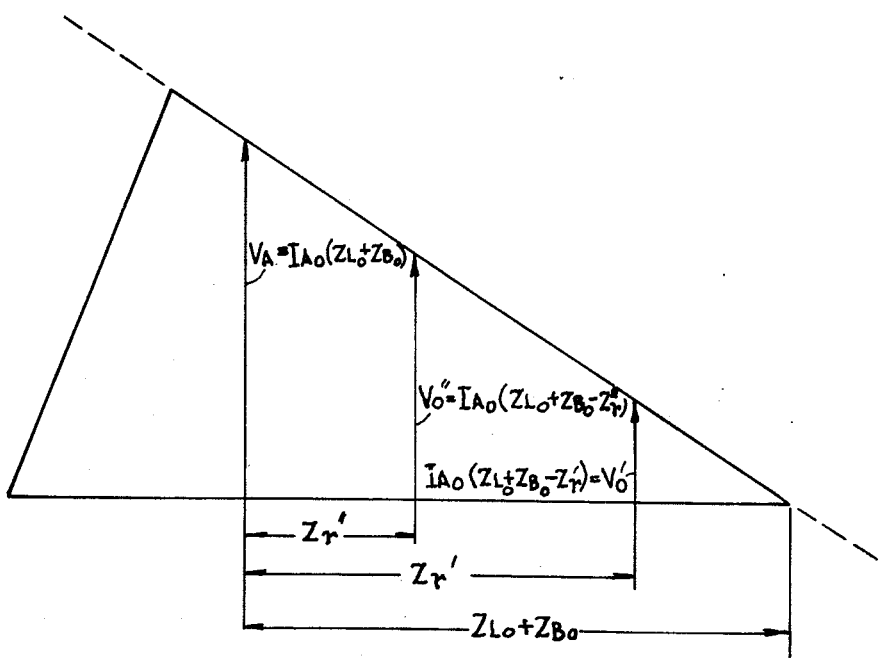

Operation of a relay arrangement in accordance with the invention in mode A for forward and reverse faults is illustrated in FIGS. 5A and 5B respectively. Similarly FIGS. 6A and 6B illustrate operation in mode B for forward and reverse faults respectively.

Figure 7:
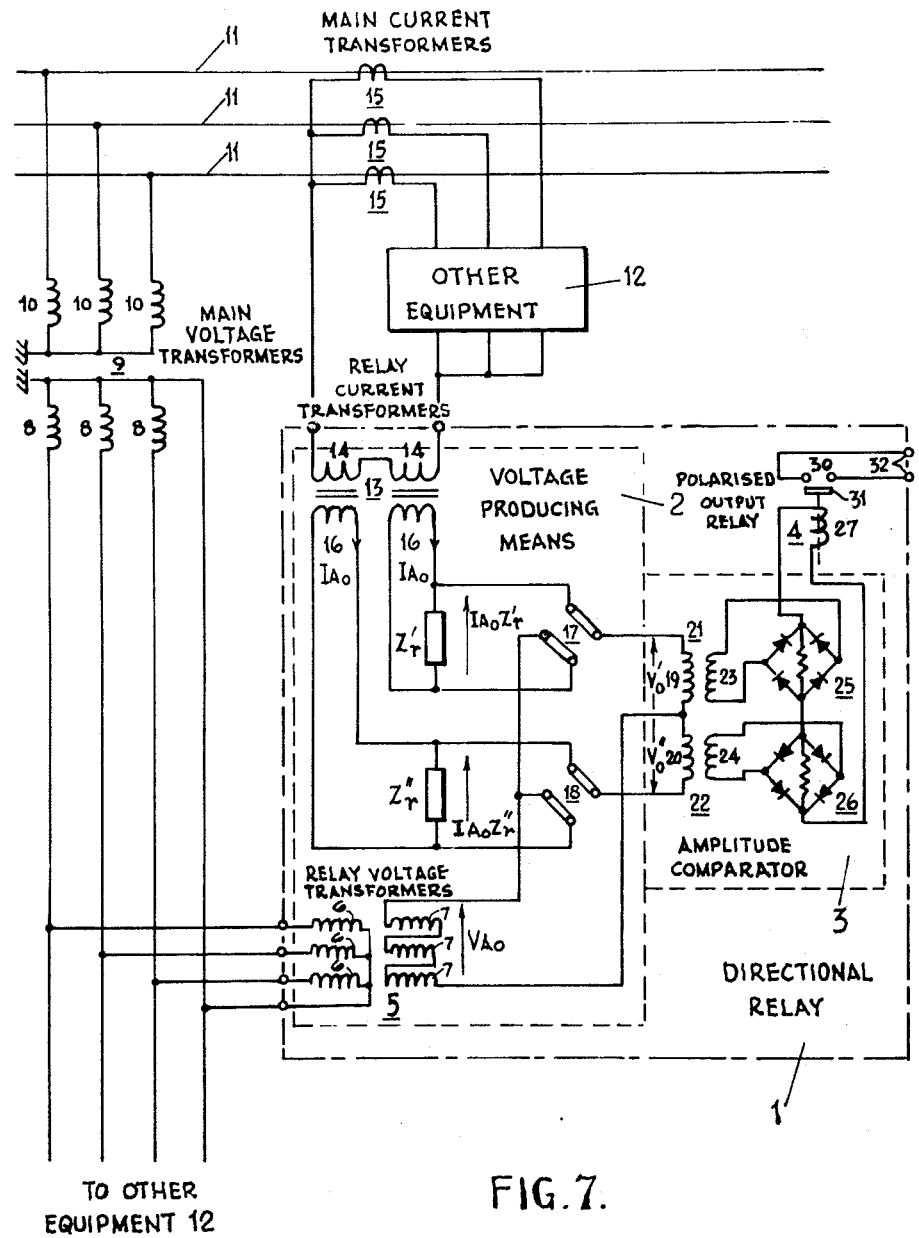
FIG. 7 is a circuit diagram of the particular relay arrangement.

The circuit of one particular differential relay arrangement in accordance with the invention for detecting the direction of unbalanced faults involving earth connection in a 3-phase electric power transmission system is shown in FIG. 7.

The relay 1 comprises means 2 for producing the voltages $V_o'$ and $V_o''$, an amplitude comparator 3 to whose input the voltages $V_o'$ and $V_o''$ are applied, and a polarised output relay 4 controlled by the output of the comparator 3.

The means 2 includes three voltage transformers 5 having star-connected primary windings 6 to which voltages representative of the power system phase voltages are applied respectively. The secondary windings 7 of the transformers 5 are connected in series so that a voltage representative of $V_{Ao}$ appears across the series connection. The primary windings 6 are supplied from the secondaries 8 of three main voltage transformers 9 whose primary windings 10 are connected with the lines 11 of the supply system. The transformers 5 will normally be used to supply voltages representative of the system phase voltages to other equipment 12 at the relaying point, as well as to the relay 1.

The means 2 further includes two current transformers 13 whose primay windings 14 are connected in series and supplied with a current representative of the sum of the phase currents if the power system, i.e. a current representative of the zero sequence current $I_{Ao}$ of the system. To this end the series connection of the windings 14 is supplied from three main current transformers 15 respectively connected with the lines 11 of the power system. The transformers 15 will normally be used to supply currents representative of the system phase currents to other equipment 12 at the relaying point, as well as to the relay 1.

The secondary windings 16 of the transformers have replica impedances $Z_r'$ and $Z_r''$ respectively connected across them so that voltages representative of $I_{Ao}Z_r'$ and $I_{Ao}Z_r''$ appear respectively across the impedances $Z_r'$ and $Z_r''$.

The voltages across the impedances $Z_r'$ and $Z_r''$ and the voltage across the series connected secondaries 7 of the transformers 5 are applied in combination via a changeover link arrangement 17, 18 to the primary windings 19 and 20 of two transformers 21 and 22 in the comparator 3 so that a voltage representative of $V_{Ao} \pm I_{Ao}Z_r'$ (i.e. $V_o'$) appears across the winding 19 and a voltage representative of $V_{Ao} \pm I_{Ao}Z_r''$ (i.e. $V_o''$) appears across the winding 20, the signs of terms $I_{Ao}Z_r'$ and $I_{Ao}Z_r''$ depending on the position of links 17 and 18 respectively.

The ends of the secondary windings 23 and 24 of the transformers 21 and 22 are respectively connected to the a.c. input terminals of two bridge rectifying arrangements 25 and 26. The negative d.c. output terminals of the bridges 25 and 26 are connected together and the operating coil 27 of the polarised relay 4 is connected between the positive d.c. output terminals of the bridges 25 and 26. Each bridge is also provided with a separate load resistor 28 or 29.

In operation a current passes through the coil 27 in one sense or the other depending on the sense of the amplitude difference of the voltages $V_o'$ and $V_o''$. The polarised relay 4 is provided with a pair of contacts 30 which are connected together by the relay armature 31 when the relay coil 27 is energised in one sense only, the contacts 30 being respectively connected to output terminals 32 of the differential relay 1. Thus, when a fault occurs, the direction of the fault with respect to the relaying point can be determined by determining whether the output terminals 32 are open- or short-circuited.

It will be appreciated that the relay described above will only indicate the direction of unbalanced faults involving earth connection. All types of unbalanced faults, with or without earth connection, can be detected with a similar relay using negative sequence quantities instead of zero-sequence quantities. In this case the input signals to the amplitude comparator would be $$V_{A2} \mp I_{A2}Z_r'$$

and $$V_{A2} \mp I_{A2}Z_r''$$

where $V_{A2}$ and $I_{A2}$ are the negative sequence voltage and current at the relaying point. The desirable limitations pointed out above regarding the moduli and signs of the impedances $Z_r'$ and $Z_r''$ also apply in this case.

I claim:

1. A directional relay for a polyphase electric power transmission system comprising: means for producing first and second voltages which are respectively of the form $V_A \mp I_A Z_r'$ and $V_A \mp I_A Z_r''$ where $V_A$ is a voltage component of the system at the relaying point; $I_A$ is the corresponding current at the relaying point; and $Z_r'$ and $Z_r''$ are impedances having values such that said first and second voltage simulate said voltage component at different points so that the amplitude difference of said first and second voltages under fault conditions corresponds in sense to the sense of the variation of said voltage component from point to point along the system between the relaying point and the fault point in a given direction along the system; and amplitude comparator means for producing an output indicative of the sense of the amplitude difference of said first and second voltages.

2. A relay according to claim 1 wherein said first and second voltages are respectively of the form $V_A - I_A Z_r'$ and $V_A - I_A Z_r''$ and the impedances $Z_r'$ and $Z_r''$ have moduli which satisfy the condition $|Z_r'| > |Z_r''|$ and the condition $|Z_r' + Z_r''| \leq 2|Z_L|$, $Z_L$ being the component, corresponding to said voltage component, of the impedance of the system between the relaying point and the end of the system in said given direction.

3. A relay according to claim 2 wherein said first and second voltages are respectively of the form $V_A - I_A Z_r'$ and $V_A + I_A Z_r''$ and the impedances $Z_r'$ and $Z_r''$ have moduli which satisfy the condition $|Z_r'| > |Z_r''|$ and the condition $|Z_r' - Z_r''| \leq 2|Z_L|$, $Z_L$ being the component, corresponding to said voltage component of the impedance of the system between the relaying point and the end of the system in said given direction.

4. A relay according to claim 2 wherein the impedances $Z_r'$ and $Z_r''$ have arguments substantially the same as that of the impedance presented to the current $I_A$ by the system.

5. A relay according to claim 1 wherein said means for producing said first and second voltages comprises: a voltage transformer arrangement which produces an output voltage representative of $V_A$; a current transformer arrangement which produces output voltages respectively representative of $I_A Z_r'$ and $I_A Z_r''$; and means for combining the output voltages of said transformer arrangements to produce said first and second voltages.

6. A relay according to claim 1 wherein said comparator means comprises: a pair of bridge rectifying arrangements; means for applying said first and second voltages across the a.c. input terminals of said bridge rectifying arrangements respectively; and a connection between one d.c. output terminal of one said rectifying arrangement and the corresponding d.c. output terminal of the other said rectifying arrangement; the relay further including output means connected between the other d.c. output terminals of the rectifying arrangements.

7. A relay according to claim 6 wherein said output means comprises a polarised relay whose operating coil is connected between said other d.c. output terminals.

8. A relay according to claim 1 wherein said voltage component is the zero sequence voltage.

9. A relay according to claim 1 wherein said voltage component is the negative sequence voltage.

* * * * *